United States Patent [19]
Kydonieus et al.

[11] Patent Number: 5,910,536
[45] Date of Patent: Jun. 8, 1999

[54] POLYURETHANE PRESSURE-SENSITIVE ADHESIVES

[75] Inventors: Agis Kydonieus, Kendall Park; Kishore Shah; Aruna Nathan, both of Bridgewater, all of N.J.

[73] Assignee: Bristol-Myers Squibb Company, New York, N.Y.

[21] Appl. No.: 08/772,217

[22] Filed: Dec. 19, 1996

Related U.S. Application Data

[60] Provisional application No. 60/008,915, Dec. 20, 1995.

[51] Int. Cl.$^6$ .................................. C08J 3/00; C08J 3/28; C08K 3/20; C08L 75/00
[52] U.S. Cl. ........................... 524/590; 522/90; 525/123; 525/131; 525/455
[58] Field of Search ............................ 524/590; 525/123, 525/131, 455; 522/90

[56] References Cited

U.S. PATENT DOCUMENTS

| | | | |
|---|---|---|---|
| 4,043,982 | 8/1977 | O'Sullivan et al. | 260/47 UA |
| 4,297,185 | 10/1981 | Chevreux et al. | 204/159.15 |
| 4,642,126 | 2/1987 | Zador et al. | 51/295 |
| 4,914,173 | 4/1990 | Ansell | 528/49 |
| 5,017,625 | 5/1991 | Ansell | 521/159 |
| 5,087,686 | 2/1992 | Ansell et al. | 528/49 |
| 5,116,930 | 5/1992 | Yabuta et al. | 528/45 |
| 5,274,045 | 12/1993 | Yukawa et al. | 525/293 |

FOREIGN PATENT DOCUMENTS

| | | |
|---|---|---|
| 2199040 | 6/1988 | United Kingdom . |
| 2207867 | 2/1989 | United Kingdom . |
| 9629374 | 9/1996 | WIPO . |

*Primary Examiner*—Patrick D. Niland
*Attorney, Agent, or Firm*—John M. Kilcoyne; Theodore R. Furman, Jr.

[57] ABSTRACT

Methods for producing poly[urethane-(meth)acrylate]-based adhesives in which an isocyanate-terminated prepolymer is reacted to convert the isocyanate terminal groups into groups capable of cross-linking with each other, excess isocyanate groups are quenched with an isocyanate group quenching compound and the resulting prepolymer is then irradiated or heated to form the polyurethane-based adhesives, and adhesives produced thereby. Alternatively, a hydroxyl-terminated prepolymer is reacted with a reagent having isocyanate and methacrylate groups to form a prepolymer which is then irradiated or heated.

22 Claims, No Drawings

POLYURETHANE PRESSURE-SENSITIVE ADHESIVES

This application claims the benefit of U.S. provisional application no. 60/008,915, filed Dec. 20, 1995.

FIELD OF THE INVENTION

This invention relates to polyurethane pressure-sensitive adhesives. More particularly, this invention relates to poly [urethane-(meth)acrylate] pressure-sensitive adhesives which exhibit a high degree of adhesion and cohesive strength so as to be especially suitable for use in a medical device for application to human skin and to unique methods of preparation. The pressure-sensitive adhesives of the present invention are especially useful for long term use exceeding one day, typically at least five days. Another aspect of this invention relates to medical devices, including ostomy devices and wound dressings, which incorporate such poly [urethane-(meth)acrylate] pressure-sensitive adhesives therein.

BACKGROUND OF THE INVENTION

Until the early 1950's, commonly used pressure-sensitive adhesives for skin applications were based on natural or synthetic rubber compositions compounded with low molecular weight tackifiers, plasticizer, stabilizers, etc. These adhesives had the disadvantage of being hydrophobic and incapable of absorbing water. Thus, such adhesives would trap water under the covered area, often causing skin maceration or other skin damage. Furthermore, the low molecular weight substances compounded into these adhesives often would penetrate the skin, causing irritation or sensitization.

Polyacrylate pressure-sensitive adhesives are an improvement over the rubber-based adhesives, partly due to their self-adhesive property. This property allows them to be prepared as single-component polymeric materials without the need for potentially allergenic modifying or tackifying agents. However, these adhesives often contain unreacted residual acrylic monomer as an impurity in an amount which would irritate and/or sensitize skin. Although these polyacrylate pressure-sensitive adhesives are much more permeable to moisture or water vapor than are the rubber-based adhesives, they are incapable of absorbing any significant amounts of moisture or water. Therefore, when used for long duration in skin or wound care applications, adhesion is compromised and/or skin damage or maceration may result.

Polyurethanes are polymeric products of diols or polyols and diisocyanates or polyisocyanates. Despite the broad applications of polyurethane chemistry, polyurethane based pressure-sensitive adhesives are not widely used and to date have been found suitable for only a few specialized applications. A suitable balance of elastic and viscous properties which is required in pressure-sensitive adhesives has not been readily attainable in conventional polyurethane materials.

Existing polyurethane based adhesives are typically comprised of aromatic polyisocyanates which function either as weak elastomers or simply as high viscosity liquids. The adhesives composed of the elastic type polyurethanes tend to fail by gradually peeling away from surfaces to which they have been applied. The high viscosity type polyurethanes, which are typically obtained by using a substantial excess of polyol, leave a residue upon removal, and their cohesive strength is too low to withstand the stresses applied in many applications. The difficulty of attaining this balance of viscoelastic characteristics in a polyurethane explains the limited effective use of polyurethane pressure-sensitive adhesives for medical devices applied to the skin.

An advance in pressure-sensitive adhesive formulations for skin and particularly for wound care applications was the development of compositions comprising blends of one or more water-soluble or swellable hydrocolloids and a tacky, viscous, polymeric material such as polyisobutylene as disclosed in Chen U.S. Pat. No. 3,339,546. Another example is Doyle et al. U.S. Pat. No. 4,551,490 which discloses medicinal grade pressure-sensitive compositions containing polyisobutylenes or blends of polyisobutylenes and butyl rubber, a styrenic radical or block type copolymer, mineral oil and water soluble hydrocolloid gum and a tackifier. Such hydrocolloid containing pressure-sensitive adhesives have the advantage of providing the desired adhesion to skin and, at the same time, are capable of absorbing transepidermal water loss (i.e., perspiration) or other body fluids, including wound exudates.

Existing hydrocolloid-containing pressure-sensitive adhesives have found use in medical applications such as ostomy devices and wound dressings, where the adhesives maintain the device on skin for several days without skin damage. However, existing hydrocolloid-containing pressure-sensitive adhesives have certain limitations in that they lack quick initial tack and tend to disintegrate upon excessive water absorption. Furthermore, existing hydrocolloid-containing pressure-sensitive adhesives are not flexible and/or easily conformable or repositionable on the skin. In addition, they often leave an undesirable residue on the skin.

Another approach to pressure-sensitive adhesives, useful in medical applications, was the development of hydrophilic adhesives. A hydrophilic adhesive which is a variation of polyacrylate based pressure-sensitive adhesives are disclosed in U.S. Pat. Nos. 4,914,173 and 5,017,625 to Ansell. The specific pressure-sensitive adhesives disclosed therein are obtained by reacting an isocyanate prepolymer, which is the reaction product of a poly-functional isocyanate and a polyoxyalkylene diol monoalkyl ether, with a hydroxy-containing ester of acrylic or methacrylic acid to form a functionalized prepolymer and then cross-linking the polymer by irradiation to form a pressure-sensitive adhesive that is not self-adherent but is capable of absorbing (hydrophilic) up to 95% by weight of water when hydrated. Such adhesives have a relatively low concentration of urethane groups and therefore do not have sufficient tack or initial adhesive properties to be adherent to the skin for certain uses.

Despite these efforts, commercially acceptable pressure-sensitive adhesives for use particularly with medical devices which attach to the patients' skin such as wound dressings and ostomy appliances have not been successful. While polyurethane based adhesives generally are less irritating to the skin than acrylic based adhesives and have better strength, polyurethane based adhesives remain problematical. This is because it has heretofore been difficult to provide a polyurethane based adhesive which exhibits excellent adhesion over an extended period of time (e.g. 5 days) while maintaining a high degree of cohesive strength so that the medical device can withstand the rigors of 5 day wear. In addition, prior methods of preparing polyurethane based adhesives are disadvantageous because it is difficult to obtain a consistently uniform product. Such methods typically employ reactions conducted at elevated temperatures. The reactants and the conditions under which they react (e.g. elevated temperatures) lead to variations in product quality and consistency.

It would therefore be a significant advance in the art of medical devices applied to the skin to provide an adhesive composition which exhibits excellent adhesion and excellent cohesive strength over extended periods of wear without irritating the patients' skin. It would be a further advance in the art to provide methods of forming pressure-sensitive adhesives especially suitable for medical applications which consistently provide a high quality product and more consistency and quality in the final product.

SUMMARY OF THE INVENTION

The present invention is generally directed to pressure-sensitive adhesive compositions and methods of making the same in which the composition exhibits both excellent adhesive properties and cohesive strength. The present invention also encompasses medical devices such as wound dressings and ostomy appliances which incorporate the pressure-sensitive composition and to methods of making such devices.

The pressure-sensitive adhesives of the present invention can be prepared by partially reacting an isocyanate (NCO—)-terminated prepolymer with a compound having both terminal methacrylate groups and either amino or hydroxyl groups or reacting a hydroxyl terminated prepolymer with a compound having both terminal isocyanate groups and terminal methacrylate groups. In the former case, excess isocyanate groups are quenched with an isocyanate group-quenching compound. The resulting prepolymer is then irradiated or subjected to elevated temperatures in the presence of an initiator.

More specifically the present invention is directed to a poly [urethane-(meth)acrylate]-based adhesive and methods of making the same and to medical devices employing the same. In accordance with one embodiment of the present invention an isocyanate-terminated prepolymer is prepared by reacting a diol or polyol with a diisocyanate whose NCO functionality is about two to form a first prepolymer having terminal isocyanate groups. The first prepolymer is reacted with an effective amount of a terminal methacrylate group containing compound capable of converting at least some of the terminal isocyanate groups on the first prepolymer to terminal methacrylate groups to form a second prepolymer having isocyanate groups and terminal methacrylate groups. The second prepolymer is then reacted when an isocyanate group quenching compound to form a third prepolymer which is subjected to irradiation or a temperature sufficient to form the poly [urethane-(meth)acrylate]-based adhesive.

In an alternative embodiment of the invention a greater than stoichiometric amount of polyol is reacted with a diisocyanate to form a hydroxyl terminated prepolymer. This first prepolymer is reacted with a reagent containing both isocyanate groups and methacrylate groups to form a second prepolymer having terminal hydroxyl and terminal methacrylate groups. The second prepolymer is then irradiated or subjected to a temperature sufficient to form a poly [urethane-(meth) acrylate] based adhesive.

In a preferred form of the invention, the prepolymer having terminal methacrylate groups is mixed with a viscosity reducing agent to reduce the viscosity of the prepolymer, making it easier to form the pressure-sensitive adhesive and/or improve its adhesive properties. The viscosity reducing agent may be in the form of a reactive diluent containing (meth) acrylate groups.

The present invention provides a poly [urethane-(meth) acrylate] adhesive composition exhibiting excellent adherence to a patients' skin without irritation for 5 days or more and excellent cohesive strength. The pressure-sensitive adhesive of the present invention also has little, if any, residual monomer to substantially reduce irritation to the patient's skin.

DETAILED DESCRIPTION OF THE INVENTION

The present invention is directed to poly [urethane-(meth) acrylate] pressure-sensitive adhesives, methods of making the same and medical articles such as wound dressings and ostomy appliances employing the same. The pressure-sensitive adhesive composition is prepared by first reacting at least one isocyanate-terminated prepolymer with a compound capable of converting the terminal isocyanate groups to terminal methacrylate groups, preferably at or about room temperature, to form a second prepolymer. If elevated temperatures are employed it is desirable to conduct the reaction in the presence of a polymerization inhibitor to prevent the methacrylate groups from polymerizing. The second prepolymer is then reacted with an isocyanate group-quenching compound to form a third prepolymer which is then irradiated or heated to form the adhesive composition.

The present process therefore employs an effective amount of a terminal methacrylate group forming compound to provide the prepolymer with terminal methacrylate groups which are capable of cross-linking with each other under UV, visible light or E-beam radiation. In the present process it is important to avoid the presence of free isocyanate groups on the prepolymer because free isocyanate groups are potentially irritating and/or toxic to the skin. Accordingly, there is provided a process step in which the isocyanate groups are quenched by reaction with a hydroxyl group or amine group containing compound which form a urethane or urea linkage. The resulting prepolymer can be irradiated, preferably in the presence of a photoinitiator, to provide the poly [urethane-(meth)acrylate] based adhesive. Alternatively, the resulting prepolymer can be heated to temperatures of at least 50° C. in the optional presence of an initiator.

The first step of the reaction process is the reaction of at least one isocyanate-terminated prepolymer with a compound capable of converting the terminal isocyanate groups to terminal methacrylate groups.

The isocyanate-terminated prepolymer may be made by reacting a polyhydroxyl compound with an isocyanate compound having a functionality of about 2 (i.e. a diisocyanate). The preferred polyhydroxyl compounds are polyols having a molecular weight of from about 1,000 to about 10,000. Although any of a wide variety of polyols can be used, those which are not crystalline are preferred. Exemplary polyols include polyetherdiols or triols (ethylene oxide and propylene oxide polymers and copolymers) such as those available from Olin (e.g. Poly G series) and ARCO (e.g. Acclaim series).

The functionality of the polyol is at least 2 and commercial examples of such polyols include those set forth in Table 1.

TABLE 1

| COMPONENT: | SUITABLE POLYOLS | | | |
|---|---|---|---|---|
| | FUNCTIONALITY | EQUIVALENT | ETO % | SUPPLIER |
| POLY G | 26-37 | 2 | 1500.00 | 0 | OLIN |
| | 55-28 | 2 | 2025.00 | 30 | OLIN |
| | 55-37 | 2 | 1512.00 | 30 | OLIN |
| | 55-56 | 2 | 976.00 | 45 | OLIN |

TABLE 1-continued

SUITABLE POLYOLS

| COMPONENT: | | FUNCTIONALITY | EQUIVALENT | ETO % | SUPPLIER |
|---|---|---|---|---|---|
| | 76-120 | 3 | 457.00 | 30 | OLIN |
| | 83-34 | 3 | 1576.00 | 70 | OLIN |
| | 85-28 | 3 | 2025.00 | 10 | OLIN |
| | 85-36 | 3 | 1508.00 | 17 | OLIN |
| VORANOL | 5148 | 3 | 2357.00 | 19 | DOW |
| | 5287 | 2 | 1018.00 | 12 | DOW |
| | 5471 | 3 | 1603.00 | 14 | DOW |
| VORAN | 220-037 | 2 | 1500.00 | 0 | DOW |
| | 232-034 | 3 | 1636.00 | 14 | DOW |
| | 240-446 | 4.5 | 125.10 | 0 | DOW |
| | 240-800 | 4 | 69.70 | 0 | DOW |
| | 270-370 | 7 | 155.90 | 0 | DOW |
| XUS | 15176.00 | 2 | 1500.00 | 30 | DOW |
| MULTRANOL | 3400 | 3 | 1000.00 | 0 | MOBAY |
| MULTRANOL | 3901 | 3 | 1997.00 | 0 | MOBAY |
| MULTRANOL | 9133 | 3 | 53.95 | 0 | MOBAY |
| DESMOFEN | 2500 | 2 | 505.00 | 0 | MOBAY |
| QUADROL | | 4 | 73.00 | 0 | MOBAY |
| CARBOWAX | 1450 | 2 | 714.00 | 100 | CARBIDE |
| | 3350 | 2 | 1638.00 | 100 | CARBIDE |
| | 4600 | 2 | 2352.00 | 100 | CARBIDE |
| | 8000 | 2 | 4141.00 | 100 | CARBIDE |
| TERATHANE | 1000 | 2 | 500.00 | 0 | DUPONT |
| | 2000 | 2 | 1024.00 | 0 | DUPONT |
| PLURACOL | 380 | 3 | 2235.00 | 0 | BASF |
| POLY THF | ER 1250 | 2 | 625.00 | 0 | BASF |
| FOMREZ | EPD-56 | 2 | 1041.00 | 45 | WITCO |
| | EPD-28 | 2 | 2086.00 | 45 | WITCO |
| | K22-170 | 6 | 308.00 | 90 | WITCO |
| | L49-28 | 3 | 1990.00 | 25 | WITCO |
| | ECFL10007 | 3 | 278.00 | 90 | WITCO |
| WITCONL | PEG1000L | 2 | 505.00 | 90 | WITCO |
| ACCLAIM | 2200 | 2 | 100o.00 | 0 | ARCO |
| | 4200 | 2 | 2000.00 | 0 | ARCO |
| | 8200 | 2 | 4000.00 | 0 | ARCO |
| | 6300 | 3 | 3000.00 | 0 | ARCO |
| | 3201 | 2 | 1500.00 | 10 | ARCO |

The isocyanates which may be used in the making of the isocyanate-terminated prepolymer are represented by the formula R(NCO)n where n is about 2 and R is an aliphatic, alicyclic, aliphatic-alicyclic, aromatic or aliphatic-aromatic hydrocarbon compound having from about 4 to 26 carbon atoms, preferably from about 6 to 20 carbon atoms and more preferably from about 6 to 13 carbon atoms.

Representative examples of diisocyanates include aliphatic isocyanates such as tetramethylene diisocyanate; hexamethylene diisocyanate; trimethylhexamethylene decamethylene diisocyanate; dimer acid diisocyanate; isophorone diisocyanate; diethylbenzene diisocyanate; 1,10-diisocyanate; cyclohexylene 1,2-diisocyanate and cyclohexylene-1,4-diisocyanate and the aromatic isocyanates such as 2,4-and 2,6-tolylene diisocyanate; 4,4-diphenylmethane diisocyanate; 1,4-naphthalene diisocyanate; dianisidine diisocyanate; toluidine diisocyanate; m-xylylene diisocyanate; tetrahydronaphthalene-1, 5-diisocyanate; and bis(4-isocyanatophenyl)methane.

A number of suitable commercial diisocyanates are listed in Table 2 below.

TABLE 2

SUITABLE DIISOCYANATES

| COMPONENT: | FUNCTIONALITY | EQUIVALENT | SUPPLIER |
|---|---|---|---|
| ISONATE 2181 | 2 | 182.60 | DOW |
| ISONATE 2125M | 2 | 125.50 | DOW |
| MONDUR CD | 2 | 143.00 | MOBAY |
| DESMODUR W | 2 | 132.00 | MOBAY |
| TMXDI | 2 | 122.10 | CYANAMID |
| TDI 80 | 2 | 87.00 | OLIN |
| DMI 1410 | 2 | 295.77 | HENKEL |
| DESMODUR H | 2 | 84.00 | BAYER |
| IPDI | 2 | 112.00 | HULS |

Generally, the ratio of the amount of polyol to the polyisocyanate can vary over a wide range. The relative amounts are selected so that there is a preferably slight excess of the diisocyanate. Preferably, the NCO/OH mol ratio is at least 1.1 to 1, more preferably from about 1.1–1.5 to 1.0 and most preferably from about 1.1–1.3 to 1.0.

In preparing the poly [urethane-(meth)acrylate] adhesives of the present invention, the polyols and the diisocyanates are reacted in the presence of known catalysts for such reaction, for example, tin salts and organic tin esters such as dioctyltin dilaurate.

The resulting prepolymer having terminal isocyanate groups is then reacted with a compound capable of converting the terminal isocyanate groups to terminal methacrylate groups. The preferred compounds useful for this purpose are those having an amine group or a hydroxyl group for reacting with the prepolymer and a methacrylate group for cross linking. The amine group reacts with the isocyanate group to form a urea linkage while the hydroxyl group gives a urethane linkage to produce a prepolymer with terminal methacrylate groups.

A preferred amine group-containing compound is N-t-butyl aminoethyl methacrylate. A preferred hydroxyl group containing compound is poly(propylene glycol) monomethacrylate.

The amount of the compound for converting the prepolymer to one having terminal methacrylate groups must be sufficient to block at least some, preferably most of the terminal isocyanate groups on the prepolymer. The amount of the terminal methacrylate group forming compound such as, for example, N-t-butyl aminoethyl methacrylate is in the range of from about 25 to 65 mole % of excess-NCO. A particularly preferred range for the terminal methacrylate group forming compound is from about 35 to 55 mole % of excess-NCO.

The thus formed prepolymer having terminal methacrylate groups is then reacted with an isocyanate group quenching compound which reacts with the remaining isocyanate groups on the prepolymer. The isocyanate group quenching compound contains a reactive group, preferably selected from the group consisting of a hydroxyl group or an amine group. The preferred isocyanate group quenching compounds are selected from alkanol amines, preferably trialkanol amines such as triethanolamine. Another example of suitable isocyanate quenching compound is methoxypolyethylene glycol.

The amount of the isocyanate group quenching compound can be determined by doing an isocyanate analysis to determine how much excess isocyanate is present. Such analytical methods are well known in the art. Once this determination is made, a suitable amount of the isocyanate group quenching compound (e.g. triethanolamine) can be added.

The amount of the isocyanate group quenching compound employed in the present invention is typically from about 75 to 35 mole % of excess-NCO. Preferably, the amount of the isocyanate group quenching compound is from about 65 to 45 mole % of excess-NCO.

The isocyanate group quenching compound reacts with the isocyanate groups present on the prepolymer so as to avoid the presence of free isocyanate groups. Instead, the isocyanate group quenching compound reacts with the isocyanate groups to form a urethane linkage.

The quenching reaction may be conducted in a broad range of temperatures, typically up to about 40° C. Room temperature is the preferred temperature for carrying out the quenching step. Higher temperatures for the quenching reaction may be used, i.e. higher than 40° C., typically in the range of from about 40 to 70° C. When operating at these elevated temperatures, it is desirable to add a compound to the reaction which is capable of preventing the polymerization of the methacrylate groups such as methoxyethyl hydroquinone.

The resulting prepolymer having terminal methacrylate groups and at least substantially all of the isocyanate groups quenched is then subjected to irradiation, such as UV radiation, visible light, E-beam radiation and the like or subjected to elevated temperatures in the optional presence of an initiator. Irradiation is preferably carried out at 365 nm in the presence of a photoinitiator such as 2,2'-dimethoxy-2-phenyl acetophenone. The amount of the photoinitiator is typically from about 0.2 to 0.4% by weight based on the weight of the prepolymer having terminal methacrylate groups.

Elevated temperatures can be used to polymerize the prepolymer. Generally the polymerization temperature will depend in part on the initiator which is used. Typical temperatures are in the range of at least 50° C., typically from about 50 to 150° C., preferably from about 60 to 120° C.

The reaction can optionally be conducted in the presence of an initiator. Examples of such initiators include benzoyl peroxide and azobisisobutyronitrile. The amount of the initiator is sufficient to commence the polymerization process and is typically in the range of from about 0.01 to 10.0% by weight based on the total weight of the prepolymer.

If necessary, the terminal methacrylate group containing prepolymer may be mixed with a viscosity reducing agent (e.g a reactive diluent)which makes the prepolymer less viscous. Examples of the viscosity reducing agent include polypropylene glycol monomethacrylate having a molecular weight in the range of from about 350 to 400.

In another aspect of the present invention, the poly [urethane-(meth)acrylate]-based adhesive is prepared by reacting excess polyol with a diisocyanate to form a hydroxyl terminated prepolymer to form a first prepolymer having terminal hydroxyl groups. The first prepolymer is then reacted with a reagent having both isocyanate groups and methacrylate groups, such as methacryloyl isocyanate, typically in the presence of a calatyst such as dioctyl tin dilaurate. The hydroxyl groups of the first prepolymer react with the isocyanate groups of the reagent to form a second prepolymer having some terminal methacrylate groups. The methacrylate terminated prepolymer is then irradiated or heated to a temperature sufficient to form the poly [urethane-(meth)acrylate]-based adhesive as described above in connection with the other embodiment of the invention.

The following examples are for illustrative purposes only and are not intended to limit the invention as encompassed by the claims forming part of the application.

EXAMPLE I

A dry three-necked flask was charged with Poly G 26-37 polyol (513.46 g, 0.33 eq of OH), Desmodur W (56.89 g, 0.43 eq NCO) and dioctyl tin dilaurate (DODL, 0.28 g, 0.05 wt %) and then mixed with a stirrer blade to avoid the trapping of air bubbles. The mixture had an NCO/OH ratio of 1.3/1. The mixture was then heated at 90° C. for about 45 minutes with stirring and under a blanket of dry nitrogen. After the reaction was completed, the reaction mixture was allowed to cool to room temperature to form a viscous polymer. The N t-butyl aminoethyl methacrylate (8.32 g, 0.045 moles, 45 mole % of free NCO groups) was added to the viscous polymer and the mixture was stirred for 2.5 hours at room temperature. After 2.5 hours triethanolamine (3.28g, 0.022 moles, 55 mole % of residual NCO groups OH: NCO=1.2: 1) was added to quench excess isocyanate. The mixture was stirred overnight. The weight average molecular weight (Mw) of the resulting methacrylate terminated prepolymer was about 60,000 Daltons.

A methacrylate modified polyurethane adhesive was prepared by first mixing the above produced methacrylate terminated prepolymer with the photoinitiator 2,2'-dimethoxy-2-phenyl acetophenone (0.4 wt %). The reaction mass was transferred to a urethane backing film (MF 4381-75) and covered on top with a transparent release Mylar (PET EXP514, 1.5 EST -S242M, Matte) to prevent surface inhibition by oxygen during curing. Using a metal nip-roll, films of thicknesses ranging from about 6 to 40 mils were cast. The films were then subjected to irradiation on the transparent side using a long wave UV lamp (365 nm, 8 mW/cm$^2$) for 30 secs–3 mins. The adhesives thus prepared showed an NCO content of <8 ppm and a gel content of 60%.

EXAMPLE II

Adhesives were prepared using the same method as set forth in Example I except that the amount of N t-butyl aminoethyl methacrylate was reduced to 40 mole % of excess NCO. The remaining free NCO was quenched using triethanolamine. The weight average molecular weight (Mw) of the resulting methacrylate terminated prepolymer was about 57,000 daltons. The adhesives prepared from the methacrylate terminated prepolymer showed an NCO content of <8 ppm and a gel content of 60%.

EXAMPLE III

Adhesives were prepared using the same method as set forth in Example I except that a reactive diluent was used to decrease viscosity of the methacrylate terminated prepolymer. The diluent used was poly(propylene glycol) monomethacrylate (weight average molecular weight=405). Concentrations of from about 20 to 30 weight % helped reduce viscosity and gave better adhesives than the prepolymer without reactive diluent. Adhesives prepared using 30% reactive diluent gave a gel content of 50% at the two different N t-butyl aminoethyl methacrylate concentrations described above.

EXAMPLE IV

Adhesives were prepared using the same method as set forth in Example I except that poly(propylene glycol) monomethacrylate (weight average molecular weight=405) was used in place of N t-butyl aminoethyl methacrylate to introduce methacrylate groups into NCO terminated prepolymer. Excess NCO was quenched using methoxypolyethylene glycol of molecular weight 550. The weight average molecular weight (Mw) of the resulting prepolymer was about 48,000 daltons. The adhesives prepared from the resulting prepolymer showed an NCO content of <8 ppm and a gel content of 60%.

EXAMPLE V

Adhesives were prepared using the same method as set forth in Example I except that the adhesives were crosslinked using electron beam radiation at 2.5 and 4.0 Mrad instead of long wave UV. Good adhesives were obtained even in the absence of a photoinitiator.

What is claimed:

1. A method of forming a based adhesive composition comprising:
    (a) reacting a diol or polyol with a diisocyanate having a functionality of about 2.0 to form a first prepolymer having terminal isocyanate groups;
    (b) reacting the first prepolymer with an effective amount of a first compound capable of converting at least some of the terminal isocyanate groups on the first prepolymer to terminal methacrylate groups to form a second prepolymer having said terminal methacrylate groups;
    (c) reacting the second prepolymer with an isocyanate group quenching compound to form a third prepolymer; and
    (d) subjecting the third prepolymer to irradiation in the presence of a photoinitiator or a temperature sufficient to form said poly[urethane-(meth)acrylate]-based adhesive.

2. The method of claim 1 comprising reacting the first prepolymer with said first compound having a reactive secondary amine group.

3. The method of claim 2 comprising reacting the first prepolymer with said first compound selected from the group consisting of N-t-butyl aminoethyl methacrylate and poly(propylene glycol) monomethacrylate.

4. The method of claim 1 comprising reacting the first prepolymer with said first compound wherein the amount of said first compound is from about 25 to 65 mole % of excess-NCO groups.

5. The method of claim 4 wherein the amount of the first compound is from about 35 to 55 mole % of excess-NCO.

6. The method of claim 1 comprising reacting the second prepolymer with said isocyanate quenching compound containing a reactive group selected from the group consisting of a hydroxyl group, an amine group and combinations thereof.

7. The method of claim 6 wherein the isocyanate quenching compound is an alkanol amine.

8. The method of claim 7 wherein the isocyanate quenching compound is a trialkanol amine.

9. The method of claim 8 wherein the isocyanate quenching compound is triethanolamine.

10. The method of claim 1 comprising reacting the second prepolymer with said isocyanate group quenching compound wherein the amount of said isocyanate group quenching compound is from about 75 to 35 mole % of excess-NCO.

11. The method of claim 1 comprising subjecting the third prepolymer to irradiation is selected from the group consisting of ultraviolet radiation, visible light and E-beam radiation.

12. The method of claim 1 comprising subjecting the third prepolymer to irradiation in the presence of 2,2'-dimethoxy-2-phenyl acetophenone.

13. The method of claim 1 wherein the amount of the photoinitiator is from about 0.2% to 0.4% by weight.

14. The method of claim 1 comprising heating the third prepolymer to a temperature of at least about 50° C.

15. The method of claim 1 comprising heating the third prepolymer in the presence of an initiator.

16. The method of claim 1 further comprising mixing the third prepolymer with a viscosity reducing agent.

17. The method of claim 1 further comprising reacting a diol or polyol with greater than a stoichiometric amount of diisocyanate in the presence of a catalyst to form said first prepolymer.

18. The method of claim 17 wherein the mole ratio of the diisocyanate to the diol or polyol is at least 1.1:1.

19. A poly[urethane(meth)acrylate]-based adhesive composition produced by the process of claim 1.

20. A method of forming a poly[urethane-(meth) acrylate] based adhesive composition comprising:
    a) reacting a greater than stoichiometric amount of polyol with a diisocyanate to form a first prepolymer having terminal hydroxyl groups;
    b) reacting the first prepolymer with a reagent having both isocyanate and methacrylate groups to form a second prepolymer having terminal hydroxyl and terminal methacrylate groups; and
    c) subjecting the second prepolymer to irradiation in the presence of a photoinitiator or a temperature sufficient to form said poly[urethane(meth)acrylate]-based adhesive.

21. The method of claim 20 wherein the reagent is methacryloyl isocyanate.

22. A poly[urethane(meth)acrylate]-based adhesive composition produced by the process of claim 20.

* * * * *